(12) United States Patent
Li et al.

(10) Patent No.: US 11,040,756 B2
(45) Date of Patent: Jun. 22, 2021

(54) POWER CONTROL METHOD AND APPARATUS, VEHICLE AND COMPUTER STORAGE MEDIUM

(71) Applicant: NINEBOT (BEIJING) TECH CO., LTD, Beijing (CN)

(72) Inventors: Xingle Li, Beijing (CN); Ji Lin, Beijing (CN); Yi Lou, Beijing (CN)

(73) Assignee: NINEBOT (BEIJING) TECH CO., LTD, Beijing (CN)

( * ) Notice: Subject to any disclaimer, the term of this patent is extended or adjusted under 35 U.S.C. 154(b) by 174 days.

(21) Appl. No.: 16/301,516

(22) PCT Filed: Jun. 13, 2017

(86) PCT No.: PCT/CN2017/088138
§ 371 (c)(1),
(2) Date: Nov. 14, 2018

(87) PCT Pub. No.: WO2017/215601
PCT Pub. Date: Dec. 21, 2017

(65) Prior Publication Data
US 2019/0270493 A1    Sep. 5, 2019

(30) Foreign Application Priority Data

Jun. 13, 2016 (CN) .......................... 201610415235.6
May 2, 2017 (CN) .......................... 201710302273.5

(51) Int. Cl.
*B62M 6/45* (2010.01)
*B60L 50/20* (2019.01)
(Continued)

(52) U.S. Cl.
CPC .............. *B62M 6/45* (2013.01); *B60K 31/04* (2013.01); *B60L 15/20* (2013.01);
(Continued)

(58) Field of Classification Search
CPC ....... B62M 6/45; B60L 15/2009; B60L 15/20; B60L 50/20; B60L 2220/44;
(Continued)

(56) References Cited

U.S. PATENT DOCUMENTS

2001/0011202 A1\* 8/2001 Yamawaki ............... B62M 6/45
701/93
2016/0067588 A1   3/2016 Tan et al.
(Continued)

FOREIGN PATENT DOCUMENTS

CN    101248469 A    8/2008
CN    102745299 A    10/2012
(Continued)

OTHER PUBLICATIONS

English_Translation_DE102011/084754 (Year: 2011).\*
(Continued)

*Primary Examiner* — Peter D Nolan
*Assistant Examiner* — Ashley L Redhead, Jr.
(74) *Attorney, Agent, or Firm* — Cooper Legal Group, LLC

(57) ABSTRACT

A power control method includes at least: detecting a first driving state of a vehicle; determining that the vehicle obtains an assisting power from outside of said vehicle according to the first driving state of the vehicle; determining a second driving state of the vehicle which is provided thereto due to the assisting power from outside; controlling the vehicle to generate a first compensating power for use in compensating power for the driving of the vehicle according to the second driving state; and controlling the vehicle to operate on the basis of the first compensation power. Also provided are a vehicle and a non-transitory computer storage medium.

9 Claims, 13 Drawing Sheets

(51) Int. Cl.
  *B60K 31/04* (2006.01)
  *B60L 15/20* (2006.01)
  *B62K 3/00* (2006.01)
(52) U.S. Cl.
  CPC ........... *B60L 15/2009* (2013.01); *B60L 50/20* (2019.02); *B62K 3/002* (2013.01); *B60L 2200/22* (2013.01); *B60L 2220/44* (2013.01); *B60L 2240/16* (2013.01); *B60L 2240/421* (2013.01); *B60L 2240/80* (2013.01); *B60L 2260/24* (2013.01); *B62K 2204/00* (2013.01)
(58) Field of Classification Search
  CPC ........... B60L 2260/24; B60L 2240/80; B60L 2240/421; B60L 2240/16; B60L 2200/22; B62K 3/002; B62K 2204/00; B60K 31/04
  See application file for complete search history.

(56) References Cited

U.S. PATENT DOCUMENTS

| | | | |
|---|---|---|---|
| 2016/0311322 | A1 | 10/2016 | Lagant et al. |
| 2016/0318578 | A1 | 11/2016 | Heber et al. |
| 2017/0313380 | A1* | 11/2017 | Corno ................. B62M 6/50 |
| 2018/0319368 | A1* | 11/2018 | Keating ................ G07C 9/30 |

FOREIGN PATENT DOCUMENTS

| | | |
|---|---|---|
| CN | 103687783 A | 3/2014 |
| CN | 104875842 A | 9/2015 |
| CN | 204916027 U | 12/2015 |
| CN | 204916031 U | 12/2015 |
| CN | 205160428 U | 4/2016 |
| CN | 105644670 A | 6/2016 |
| CN | 105836007 A | 8/2016 |
| CN | 205469633 U | 8/2016 |
| CN | 106080879 A | 11/2016 |
| CN | 106155058 A | 11/2016 |
| CN | 106476974 A | 3/2017 |
| DE | 102011084754 A1 | 4/2013 |
| DE | 102011084754 A1 * | 4/2013 ............ B62K 3/002 |
| EP | 2777783 A1 | 9/2014 |
| JP | 2005335534 A | 12/2005 |
| WO | 2015086274 A1 | 6/2015 |
| WO | 2015091074 A1 | 6/2015 |
| WO | 2015128239 A1 | 9/2015 |
| WO | 2016079614 A1 | 5/2016 |
| WO | 2016139050 A1 | 9/2016 |

OTHER PUBLICATIONS

Supplementary European Search Report in the European application No. 17812712.2, dated May 21, 2019, 8 pgs.
English translation of the Written Opinion of the International Search Authority in the international application No. PCT/CN2017/088138, dated Sep. 6, 2017, 6 pgs.
International Search Report in international application No. PCT/CN2017/088138, dated Sep. 6, 2017, 3 pgs.
Written Opinion of the International Search Authority in international application No. PCT/CN2017/088138, dated Sep. 6, 2017, 5 pgs.

* cited by examiner

POWER CONTROL METHOD AND APPARATUS, VEHICLE AND COMPUTER STORAGE MEDIUM

CROSS-REFERENCE TO RELATED APPLICATIONS

The present application is based upon and claims priority to Chinese Patent Application No. 201610415235.6 filed on Jun. 13, 2016 and Chinese Patent Application No. 201710302273.5 filed on May 2, 2017, the contents of which are incorporated herein by reference in their entirety.

TECHNICAL FIELD

The disclosure relates to the technical field of vehicles, and in particular to a power control method and apparatus, a vehicle and a computer storage medium.

BACKGROUND

An electric scooter is widely applied because of its characteristics of small size, low energy consumption, capability of alleviating road traffic pressure and high entertainment.

The electric scooter provided in the related art at least has the following problems.

The electric scooter is provided with an accelerator to control the power output and to adjust a traveling velocity of the electric scooter. The intrinsic size of the electric scooter is limited, the provision of the accelerator increases the overall cost and installation difficulty of the electric scooter on one hand, and on the other hand, the operation skill of a riding user during a riding process is highly demanded. As a result, the accelerator must be controlled constantly to maintain a normal traveling velocity. Since the control of the accelerator often is very sensitive and is difficult for the user to operate accurately, there has a potential safety hazard.

SUMMARY

In order to solve the above technical problems, the embodiments of the disclosure provide a power control method and apparatus, a vehicle and a computer storage medium, which may support a user to control a power of an electric scooter in a convenient manner.

A power control method provided by an embodiment of the disclosure may include the following operations.

A first traveling state of a vehicle is detected.

It is determined according to the first traveling state of the vehicle that the vehicle obtains an assisting power from an outside of the vehicle.

A second traveling state of the vehicle resulted from the assisting power from the outside is determined.

The vehicle is controlled according to the second traveling state to generate a first compensation power configured to compensate for a power for the traveling of the vehicle.

The vehicle is controlled to travel based on the generated first compensation power.

A power control method provided by another embodiment of the disclosure is applied to a vehicle; the vehicle includes a driving wheel and a wheel hub motor arranged at the driving wheel; the wheel hub motor is provided with multiple Hall sensors; and the method may include the following operations.

A light slide friction coefficient $\mu$ is read, where the light slide friction coefficient $\mu$ is smaller than an inertial friction coefficient n of the vehicle.

A rotational velocity of a rotor of the wheel hub motor is sensed using the Hall sensors.

Calculation is performed from the rotational velocity of the rotor to generate a rotor acceleration of the wheel hub motor.

A change in the rotor acceleration is monitored to generate an acceleration abrupt value.

When an acceleration abrupt value greater than a preset threshold is monitored, a motor assisted slide mode is started, and an instantaneous maximum slide rotational velocity VSmax of the rotor is obtained.

The rotor of the wheel hub motor is driven to perform a uniformly decelerated motion at a light slide rotational velocity Vs (t), where the light slide rotational velocity Vs (t)=VSmax-$\mu$*Ts, where Ts is an assisted slide time for which the motor assisted slide mode lasts.

A power control apparatus provided by an embodiment of the disclosure may include a first detection module, a determination module, a generation module and a control module.

The first detection module is arranged to detect a first traveling state of a vehicle.

The determination module is arranged to determine according to the first traveling state of the vehicle that the vehicle obtains an assisting power from an outside of the vehicle, and determine a second traveling state of the vehicle resulted from the assisting power from the outside.

The generation module is arranged to control, according to the second traveling state, the vehicle to generate a first compensation power configured to compensate for a power for the traveling of the vehicle.

The control module is arranged to control the vehicle to travel based on the generated first compensation power.

A power control apparatus provided by another embodiment of the disclosure is applied to a vehicle; the vehicle includes a driving wheel and a wheel hub motor arranged at the driving wheel; the wheel hub motor is provided with multiple Hall sensors and is arranged to sense a rotational velocity of a rotor of the wheel hub motor; and the apparatus may include a control parameter reading module and a calculation and control module.

The control parameter reading module is arranged to read a light slide friction coefficient $\mu$, where the light slide friction coefficient $\mu$ is smaller than an inertial friction coefficient n of the vehicle.

The calculation and control module is arranged to calculate from the rotational velocity of the rotor to generate a rotor acceleration of the wheel hub motor, monitor a change in the rotor acceleration to generate an acceleration abrupt value, start a motor assisted slide mode and obtain an instantaneous maximum slide rotational velocity VSmax of the rotor when an acceleration abrupt value greater than a preset threshold is monitored, and drive the rotor of the wheel hub motor to perform a uniformly decelerated motion at a light slide rotational velocity Vs (t), where the light slide rotational velocity Vs (t)=VSmax-$\mu$*Ts, where Ts is an assisted slide time for which the motor assisted slide mode lasts.

A vehicle provided by an embodiment of the disclosure includes a vehicle body, a power driving component, a sensor and a controller. The power driving component is connected with the vehicle body and is arranged to drive the vehicle to travel under the control of the controller.

The sensor is arranged to detect a first traveling state of the vehicle.

The controller is arranged to obtain a first traveling state of the vehicle; determine according to the first traveling state of the vehicle that the vehicle obtains an assisting power from an outside of the vehicle; determine a second traveling state of the vehicle resulted from the assisting power from the outside; control, according to the second traveling state, the vehicle to generate a first compensation power configured to compensate for a power for the traveling of the vehicle; and control the vehicle to travel based on the generated first compensation power.

A vehicle provided by another embodiment of the disclosure includes a driving wheel, an electric energy device, and a wheel hub motor arranged at the driving wheel; the wheel hub motor is provided with multiple Hall sensors; the electric energy device supplies an operation power to the wheel hub motor; and the vehicle further includes the above-mentioned power control apparatus.

A computer storage medium provided by an embodiment of the disclosure stores a computer program; and the computer program is configured to execute the above-mentioned power control method.

In the technical solutions of the embodiments of the disclosure, a first traveling state of a vehicle is detected; it is determined according to the first traveling state of the vehicle that the vehicle obtains an assisting power from an outside of the vehicle; a second traveling state of the vehicle resulted from the assisting power from the outside is determined; the vehicle is controlled according to the second traveling state to generate a first compensation power configured to compensate for a power for the traveling of the vehicle; and the vehicle is controlled to travel based on the generated first compensation power. By adopting the technical solutions of the embodiments of the disclosure, the traveling of the vehicle may be controlled without an accelerator and only using the assisting power from the outside of the vehicle, so the vehicle cost caused by provision of the accelerator is reduced. Furthermore, a user may flexibly control the traveling of the vehicle in a foot stamping manner, so the operation manner is simple, easy, safe and reliable, and the enjoyment for the use of the vehicle is greatly increased.

In the technical solutions of the embodiments of the disclosure, since the built-in Hall sensors provided by the wheel hub motor are used to monitor the acceleration abrupt value of the driving wheel of the vehicle, the same effect that the motion state monitoring is performed by using an acceleration sensor can be achieved; and moreover, the acceleration sensor is not required to be added additionally, so the weight of the vehicle is reduced, and the production cost of the vehicle is reduced.

DETAILED DESCRIPTION

In order to know the features and technical contents in the embodiments of the disclosure more thoroughly, the implementation of the embodiments of the disclosure will be described below in detail in combination with the accompanying drawings below. The accompanying drawings are merely for reference and are not intended to limit the embodiments of the disclosure.

Figure 1:
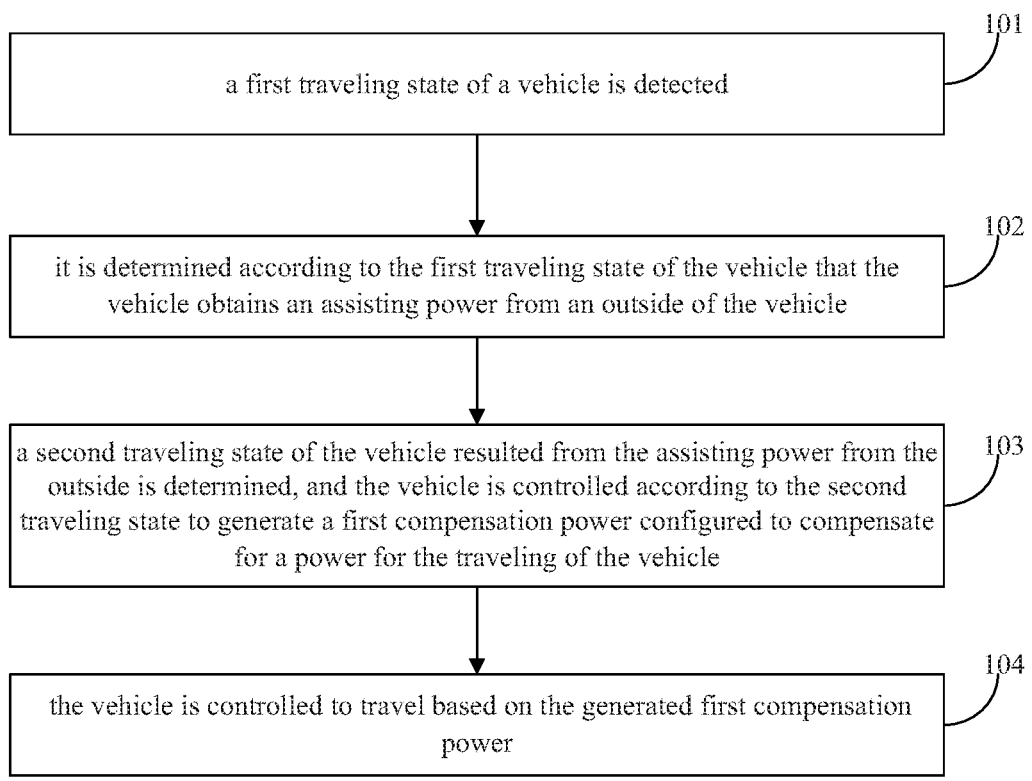
FIG. 1 is a first flowchart schematic diagram of a power control method according to an embodiment of the disclosure.

FIG. 1 is a first flowchart schematic diagram of a power control method according to an embodiment of the disclosure. As shown in FIG. 1, the power control method may include the following operations.

At 101, a first traveling state of a vehicle is detected.

The vehicle in this embodiment of the disclosure refers to a trackless vehicle, such as a two-wheel scooter, a three-wheel scooter and a four-wheel scooter. A user may drive or ride the vehicle at any site.

In this embodiment of the disclosure, an accelerator does not need to be provided by the vehicle, so the cost thereto is saved. Of course, with a view to the compatibility of the existing vehicle, the accelerator may also be provided by the vehicle. What is noteworthy is that the implementation for the technical solutions in this embodiment of the disclosure is not affected if the accelerator is provided.

Figure 2:
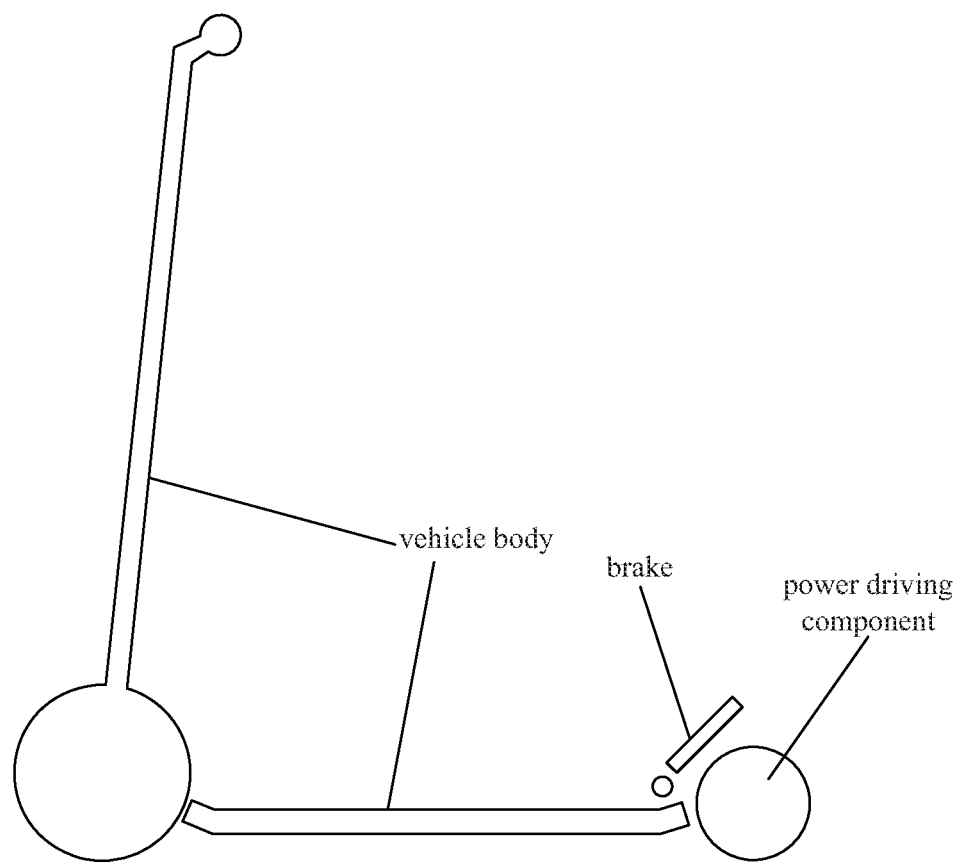
FIG. 2 is a first schematic diagram of a scooter according to an embodiment of the disclosure.

As shown in FIG. 2, the vehicle includes a vehicle body, a power driving component and a controller (not shown in the figure). The power driving component is connected with the vehicle body and is arranged to drive the vehicle to travel under the control of the controller. In FIG. 2, the power driving component is of a rear wheel driving type. Of course, the power driving component may also be of a front wheel driving type. The power driving component at least is composed of the following components: a driving wheel (namely a wheel), and a motor arranged at the driving wheel. A sensor capable of detecting a position of a power output rotor may be provided in the motor.

In this embodiment of the disclosure, the vehicle is provided with two working modes, namely a non-motor assisted slide mode and a motor assisted slide mode.

When the motor assisted slide mode is not started, the first traveling state of the vehicle is detected, where the first traveling state of the vehicle may be characterized by a first acceleration of the vehicle, and the first acceleration includes at least one of the followings: an acceleration with which the vehicle travels, or a rotational acceleration of the power output rotor of the vehicle.

For example, the first acceleration is the rotational acceleration of the power output rotor. The position of the power output rotor is detected using the sensor in the driving wheel, the rotational velocity and the rotational acceleration of the power output rotor are calculated according to the position of the power output rotor and the calculated rotational velocity is used for characterizing the current first traveling state of the vehicle. During an actual application, parameters for characterizing the first traveling state of the vehicle are not limited to the above example, and may also be, for example, a velocity, a damping coefficient and the like of the vehicle, all of which will not be limited by this embodiment of the disclosure.

At 102, it is determined according to the first traveling state of the vehicle that the vehicle obtains an assisting power from an outside of the vehicle.

In one implementation manner, the first acceleration of the vehicle is detected, the first acceleration of the vehicle is compared with a preset acceleration threshold, and when the first acceleration is greater than the acceleration threshold, the vehicle is determined to obtain the assisting power from the outside of the vehicle.

Herein, the smaller the preset acceleration threshold, the higher the sensitivity for starting the motor assisted slide mode. The personalized acceleration thresholds may be provided for different users according to their experiences.

For example, the acceleration threshold is 0. At this moment, the sensitivity for starting the motor assisted slide mode is the highest; and when the first acceleration is greater than 0, the vehicle is determined to obtain the assisting power from the outside of the vehicle.

For example, the acceleration threshold is F (F>0). At this moment, when the first acceleration is greater than F, the vehicle is determined to obtain the assisting power from the outside of the vehicle.

At 103, a second traveling state of the vehicle resulted from the assisting power from the outside is determined, and the vehicle is controlled according to the second traveling state to generate a first compensation power configured to compensate for a power for the traveling of the vehicle.

In this embodiment of the disclosure, it is assumed that the first acceleration is a1 and the acceleration threshold is F, the larger the a1-F, the larger the assisting power obtained by the vehicle from the outside. Conversely, the smaller the a1-F, the smaller the assisting power obtained by the vehicle from the outside.

Herein, the reasons for generating the assisting power include but not limited to the followings.

1) One foot of the user stamps on the vehicle body and the other foot hits the ground to obtain the assisting power for the vehicle.

2) An external elastic apparatus is applied to the vehicle so that the vehicle obtains the assisting power.

3) When the vehicle heads a downhill, the assisting power is obtained because of the self gravity.

Figure 3:
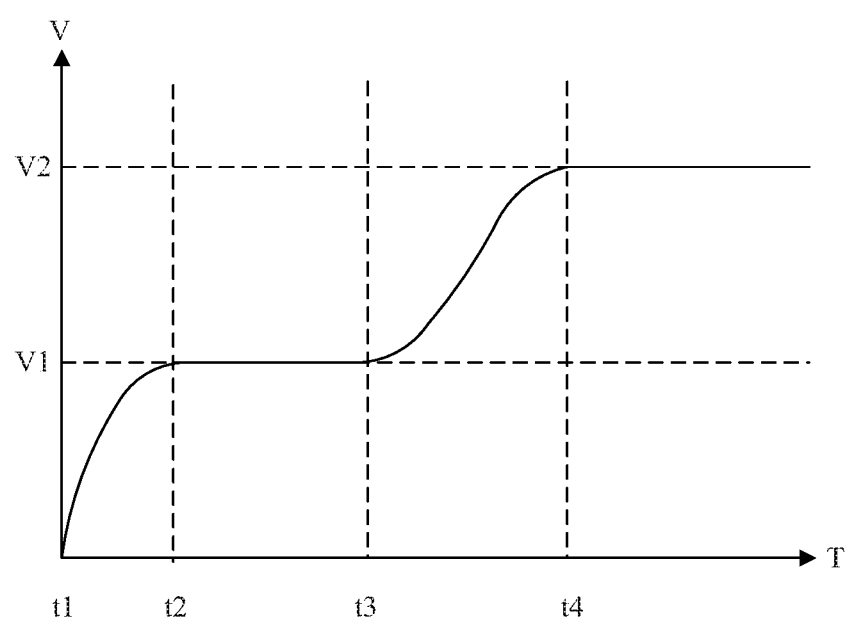
FIG. 3 is a schematic diagram showing a velocity change when a vehicle obtains an assisting power from an outside according to an embodiment of the disclosure.

In this embodiment of the disclosure, when the vehicle obtains the assisting power from the outside, the velocity of the vehicle is changed. As shown in FIG. 3, at the t1-t2 moment, the vehicle obtains the assisting power from the outside and the velocity is changed from 0 to V1; and at the t3-t4 moment, the vehicle obtains the assisting power from the outside and the velocity is changed from V1 to V2.

Herein, the second traveling state of the vehicle resulted from the assisting power from the outside refers to a traveling velocity of the vehicle during a period when the vehicle obtains the assisting power from the outside, where the traveling velocity includes at least one of the following types:

a maximum velocity that the vehicle has during the period when the vehicle obtains the assisting power from the outside;

an average velocity that the vehicle has during the period when the vehicle obtains the assisting power from the outside;

a maximum rotational velocity of the power output rotor of the vehicle motor during the period when the vehicle obtains the assisting power from the outside; or an average rotational velocity of the power output rotor of the vehicle motor during the period when the vehicle obtains the assisting power from the outside.

In this embodiment of the disclosure, from the moment when the assisting power from the outside of the vehicle disappears, the motor assisted slide motor needs to be started, and power compensation is performed on the traveling of the vehicle using the motor.

When the power compensation is performed on the traveling of the vehicle using the motor, it is necessary to first control, according to the second traveling state, the vehicle to generate a first compensation power configured to compensate for a power for the traveling of the vehicle. Herein, the second traveling state of the vehicle may be represented by a traveling velocity of the vehicle in the process when the power from the outside is obtained. For example, the traveling velocity is Vend, the first compensation power may be kept at the Vend to maintain the traveling velocity of the vehicle, i.e., the vehicle travels at a fixed velocity. The first compensation power may further maintain the vehicle to decelerate according to a special negative acceleration.

In this embodiment of the disclosure, the first compensation power may be provided with two types that are a positive compensation power and a negative compensation power respectively. Herein, the positive compensation power maintains the vehicle to travel at a constant velocity (the resistance needs to be overcome) or accelerate, and the negative compensation power maintains the vehicle to decelerate.

In addition, the assisting power from the outside of the vehicle is identical or reverse to a vehicle traveling direction and thus is also provided with two types, namely, a positive assisting power and a negative assisting power. Herein, the direction of the first acceleration corresponding to the positive assisting power is identical to the vehicle traveling direction (for example, the foot hits the ground to assist the acceleration), and the direction of the first acceleration corresponding to the negative assisting power is reverse to the vehicle traveling direction (for example, the foot hits the ground to brake).

Of course, the parameters for characterizing the first traveling state of the vehicle in this embodiment of the disclosure are not limited to the above example, and may also be, for example, the acceleration and the like of the vehicle, all of which will not be limited by this embodiment of the disclosure.

At 104, the vehicle is controlled to travel based on the generated first compensation power.

Figure 4:
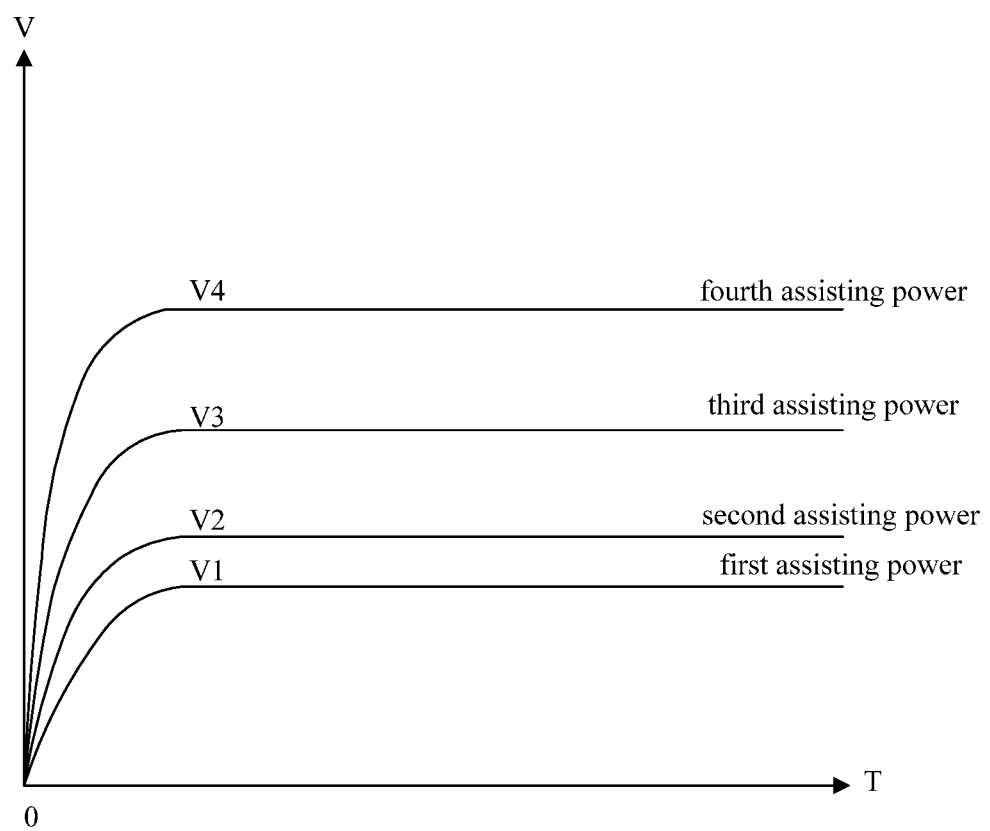
FIG. 4 is a diagram showing velocity changes of a vehicle corresponding to four different assisting powers according to an embodiment of the disclosure.

In this embodiment of the disclosure, for example, the assisting power from the outside of the vehicle is identical to the vehicle traveling direction. As shown in FIG. 4, when the vehicle is driven by different assisting powers, the generated second traveling states are also different. FIG. 4 shows a velocity change condition of a vehicle when the vehicle is driven by four different assisting powers. From the moment when the assisting power disappears, the velocity of the vehicle is up to a maximum value, and this velocity is taken as an initial velocity for power compensation at the first compensation power. The initial velocity may be maintained through the first compensation power. It may also be possible to use the first compensation power to enable the vehicle to decelerate from the initial velocity.

Figure 5:
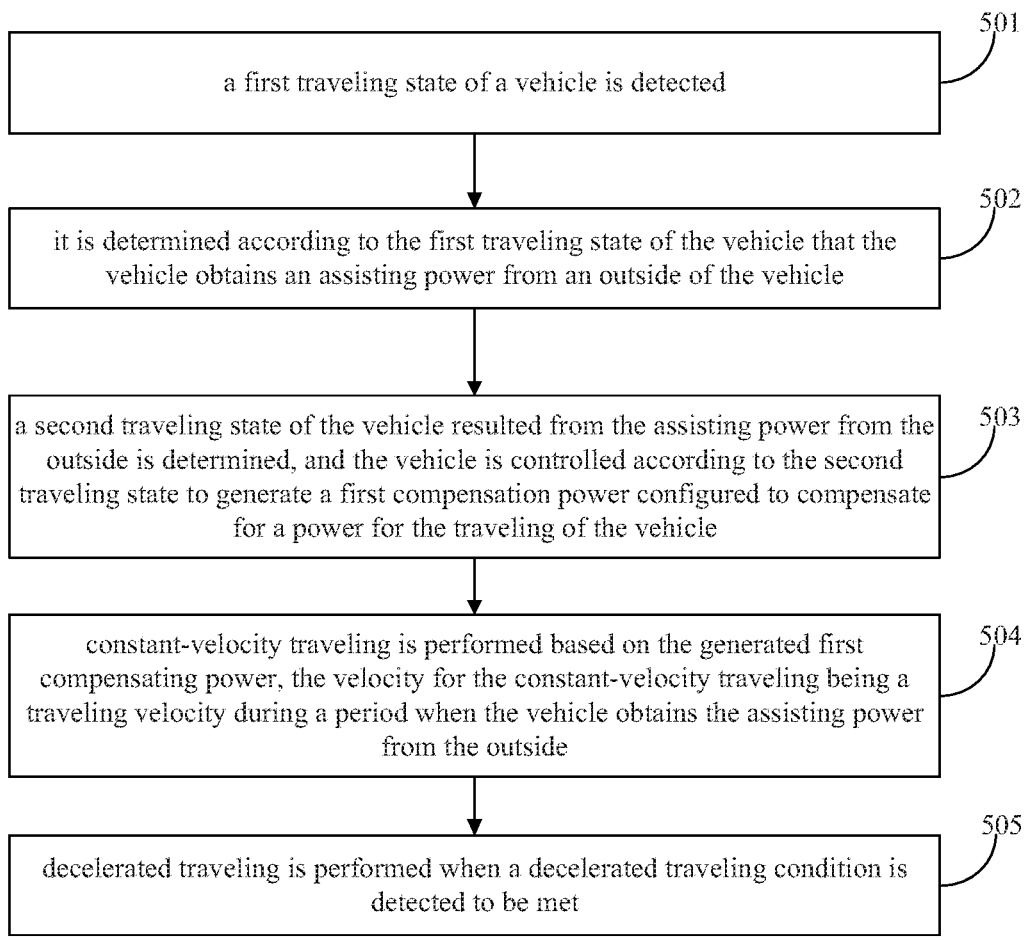
FIG. 5 is a second flowchart schematic diagram of a power control method according to an embodiment of the disclosure.

FIG. 5 is a second flowchart schematic diagram of a power control method according to an embodiment of the disclosure. As shown in FIG. 5, the power control method may include the following operations.

At 501, a first traveling state of a vehicle is detected.

The vehicle in this embodiment of the disclosure refers to a trackless vehicle, such as a two-wheel scooter, a three-wheel scooter and a four-wheel scooter. A user may drive or ride the vehicle at any site.

In this embodiment of the disclosure, an accelerator does not need to be provided by the vehicle, so the cost thereto is saved. Of course, with a view to the compatibility of the existing vehicle, the accelerator may also be provided by the vehicle. What is noteworthy is that the implementation for the technical solutions in this embodiment of the disclosure is not affected if the accelerator is provided.

As shown in FIG. 2, the vehicle includes a vehicle body, a power driving component and a controller (not shown in the figure). The power driving component is connected with the vehicle body and is arranged to drive the vehicle to travel under the control of the controller. In FIG. 2, the power driving component is of a rear wheel driving type. Of course, the power driving component may also be of a front wheel driving type. The power driving component at least is composed of the following components: a driving wheel (namely a wheel), and a motor arranged at the driving wheel. A sensor capable of detecting a position of a power output rotor may be provided in the motor.

In this embodiment of the disclosure, the vehicle is provided with two working modes, namely a non-motor assisted slide mode and a motor assisted slide mode.

When the motor assisted slide mode is not started, the first traveling state of the vehicle is detected, where the first traveling state of the vehicle may be characterized by a first acceleration of the vehicle, and the first acceleration includes at least one of the followings: an acceleration with which the vehicle travels, or a rotational acceleration of the power output rotor of the vehicle.

For example, the first acceleration is the rotational acceleration of the power output rotor. The position of the power output rotor is detected using the sensor in the driving wheel, and the rotational velocity and the rotational acceleration of the power output rotor are calculated according to the position of the power output rotor.

At 502, it is determined according to the first traveling state of the vehicle that the vehicle obtains an assisting power from an outside of the vehicle.

In one implementation manner, the first acceleration of the vehicle is detected, the first acceleration of the vehicle is compared with a preset acceleration threshold, and when the first acceleration is greater than the acceleration threshold, the vehicle is determined to obtain the assisting power from the outside of the vehicle.

Herein, the smaller the preset acceleration threshold, the higher the sensitivity for starting the motor assisted slide mode. The personalized acceleration thresholds may be provided for different users according to their experiences.

For example, the acceleration threshold is 0. At this moment, the sensitivity for starting the motor assisted slide mode is the highest; and when the first acceleration is greater than 0, the vehicle is determined to obtain the assisting power from the outside of the vehicle.

For example, the acceleration threshold is F (F>0). At this moment, when the first acceleration is greater than F, the vehicle is determined to obtain the assisting power from the outside of the vehicle.

At 503, a second traveling state of the vehicle resulted from the assisting power from the outside is determined, and the vehicle is controlled according to the second traveling state to generate a first compensation power configured to compensate for a power for the traveling of the vehicle.

In this embodiment of the disclosure, it is assumed that the first acceleration is a1 and the acceleration threshold is F, the larger the a1-F, the larger the assisting power obtained by the vehicle from the outside. Conversely, the smaller the a1-F, the smaller the assisting power obtained by the vehicle from the outside.

Herein, the reasons for generating the assisting power include but not limited to the followings.

1) One foot of the user stamps on the vehicle body and the other foot hits the ground to obtain the assisting power for the vehicle.

2) An external elastic apparatus is applied to the vehicle so that the vehicle obtains the assisting power.

3) When the vehicle heads a downhill, the assisting power is obtained because of the self gravity.

In this embodiment of the disclosure, when the vehicle obtains the assisting power from the outside, the velocity of the vehicle is changed. As shown in FIG. 3, at the t1-t2 moment, the vehicle obtains the assisting power from the outside and the velocity is changed from 0 to V1; and at the t3-t4 moment, the vehicle obtains the assisting power from the outside and the velocity is changed from V1 to V2.

Herein, the second traveling state of the vehicle resulted from the assisting power from the outside refers to a traveling velocity of the vehicle during a period when the vehicle obtains the assisting power from the outside, where the traveling velocity includes at least one of the following types:

a maximum velocity that the vehicle has during the period when the vehicle obtains the assisting power from the outside;

an average velocity that the vehicle has during the period when the vehicle obtains the assisting power from the outside;

a maximum rotational velocity of the power output rotor of the vehicle motor during the period when the vehicle obtains the assisting power from the outside; or an average rotational velocity of the power output rotor of the vehicle motor during the period when the vehicle obtains the assisting power from the outside.

In this embodiment of the disclosure, from the moment when the assisting power from the outside of the vehicle disappears, the motor assisted slide motor needs to be started, and power compensation is performed on the traveling of the vehicle using the motor.

When the power compensation is performed on the traveling of the vehicle using the motor, it is necessary to first control, according to the second traveling state, the vehicle to generate a first compensation power configured to compensate for a power for the traveling of the vehicle. Herein, the second traveling state of the vehicle may be represented by a traveling velocity of the vehicle in the process when the power from the outside is obtained. For example, the traveling velocity is Vend, the first compensation power may be kept at the Vend to maintain the traveling velocity of the vehicle, i.e., the vehicle travels at a fixed velocity.

At 504, constant-velocity traveling is performed based on the generated first compensation power, the constant velocity being a traveling velocity during a period when the vehicle obtains the assisting power from the outside.

As shown in FIG. 4, when the vehicle is driven by different assisting powers, the generated second traveling states are also different. FIG. 4 shows a velocity change condition of a vehicle when the vehicle is driven by four different assisting powers. From the moment when the assisting power disappears, the velocity of the vehicle is up to a maximum value, and this velocity is taken as an initial velocity for power compensation at the first compensation power. The initial velocity may be maintained through the first compensation power.

With the scooter shown in FIG. 2 as an example, in a static state, one foot of the user stands on a pedal of the scooter and the other foot hits the ground and the vehicle body will slide at the initial velocity at the moment when the foot leaves away from the ground. In the process of hitting the ground, first of all, the scooter is determined to obtain an assisting power from the outside according to a detected first traveling state of the scooter; then, a velocity of the scooter (namely, a second traveling state) is determined at the moment when the foot leaves away from the ground; and at last, the scooter is controlled to generate a first compensation power to maintain the scooter to travel at a fixed velocity according to this velocity, thus implementing seamless transition and intervention of the motor power. During a slide process, if the foot of the user hits the ground again, the vehicle body will travel at a fixed velocity that is a new velocity generated when the foot leaves away from the ground.

At 505, decelerated traveling is performed when a decelerated traveling condition is detected to be met.

Herein, the decelerated traveling condition includes at least one of the followings:

a time for which the vehicle travels with the constant velocity reaches a predetermined duration;

a mileage that the vehicle travels with the constant velocity reaches a predetermined mileage; or a decelerated traveling instruction is received.

In this embodiment of the disclosure, in order to guarantee the safety of the user, the vehicle needs to be decelerated under a special condition. For example, the decelerated traveling is performed when the time for which the vehicle travels with the constant velocity reaches the predetermined duration or the mileage that the vehicle travels with the constant velocity reaches the predetermined mileage. At this moment, a traffic hidden trouble caused by impaired concentration of the user may be prevented. Also for example, the decelerated traveling is performed when the decelerated traveling instruction is received. Herein, the decelerated traveling instruction is also referred to a brake instruction. As shown in FIG. 2, a brake component is provided at a rear side of the vehicle, and when the brake component is stamped by the user, the brake instruction may be triggered to the controller. Besides, the brake component may further be taken as a mud guard of the vehicle, so that the use function of the component is fully expanded.

In one implementation manner, when the brake component is stamped by the user, the power of the motor is cut off and the vehicle is decelerated to travel under the action of a ground resistance. In another implementation manner, when the brake component is stamped by the user, the motor continues to rotate and is decelerated to rotate to control the decelerated traveling of the vehicle.

Figure 6:
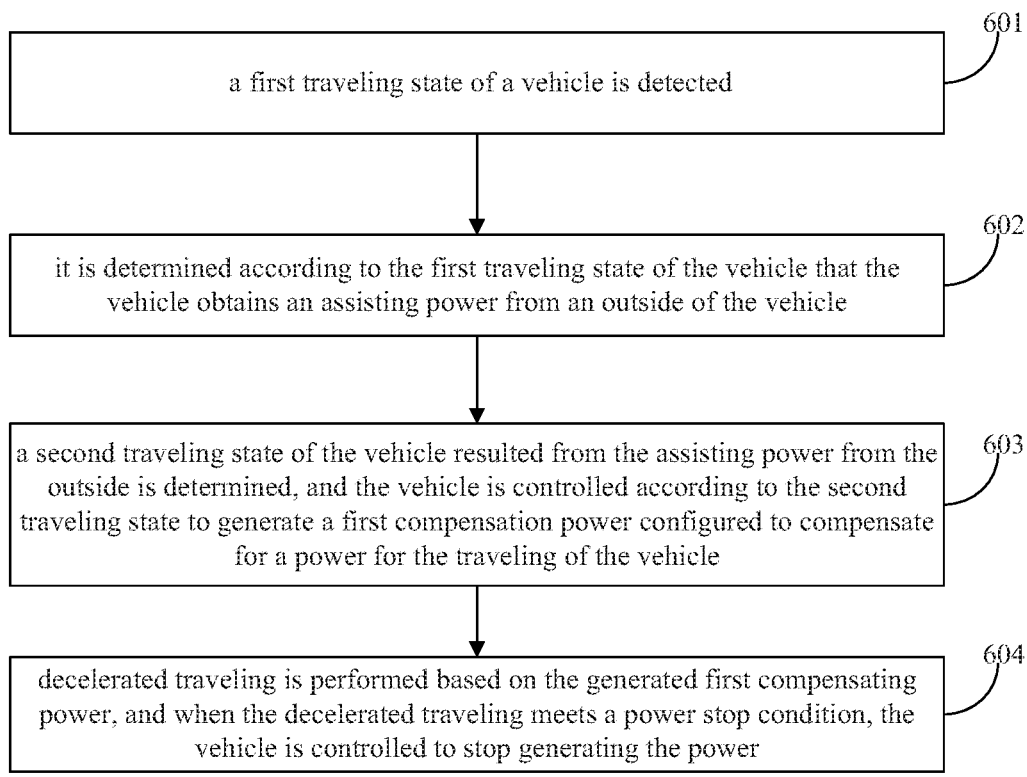
FIG. 6 is a third flowchart schematic diagram of a power control method according to an embodiment of the disclosure.

FIG. 6 is a third flowchart schematic diagram of a power control method according to an embodiment of the disclosure. As shown in FIG. 6, the power control method may include the following operations.

At 601, a first traveling state of a vehicle is detected.

The vehicle in this embodiment of the disclosure refers to a trackless vehicle, such as a two-wheel scooter, a three-wheel scooter and a four-wheel scooter. A user may drive or ride the vehicle at any site.

In this embodiment of the disclosure, an accelerator does not need to be provided by the vehicle, so the cost thereto is saved. Of course, with a view to the compatibility of the existing vehicle, the accelerator may also be provided by the vehicle. What is noteworthy is that the implementation for the technical solutions in this embodiment of the disclosure is not affected if the accelerator is provided.

As shown in FIG. 2, the vehicle includes a vehicle body, a power driving component and a controller (not shown in the figure). The power driving component is connected with the vehicle body and is arranged to drive the vehicle to travel under the control of the controller. In FIG. 2, the power driving component is of a rear wheel driving type. Of course, the power driving component may also be of a front wheel driving type. The power driving component at least is composed of the following components: a driving wheel (namely a wheel), and a motor arranged at the driving wheel. A sensor capable of detecting a position of a power output rotor may be provided in the motor.

In this embodiment of the disclosure, the vehicle is provided with two working modes, namely a non-motor assisted slide mode and a motor assisted slide mode.

When the motor assisted slide mode is not started, the first traveling state of the vehicle is detected, where the first traveling state of the vehicle may be characterized by a first acceleration of the vehicle, and the first acceleration includes at least one of the followings: an acceleration with which the vehicle travels, or a rotational acceleration of the power output rotor of the vehicle.

For example, the first acceleration is the rotational acceleration of the power output rotor. The position of the power output rotor is detected using the sensor in the driving wheel, and the rotational velocity and the rotational acceleration of the power output rotor are calculated according to the position of the power output rotor.

At 602, it is determined according to the first traveling state of the vehicle that the vehicle obtains an assisting power from an outside of the vehicle.

In one implementation manner, the first acceleration of the vehicle is detected, the first acceleration of the vehicle is compared with a preset acceleration threshold, and when the first acceleration is greater than the acceleration threshold, the vehicle is determined to obtain the assisting power from the outside of the vehicle.

Herein, the smaller the preset acceleration threshold, the higher the sensitivity for starting the motor assisted slide mode. The personalized acceleration thresholds may be provided for different users according to their experiences.

For example, the acceleration threshold is 0. At this moment, the sensitivity for starting the motor assisted slide mode is the highest; and when the first acceleration is greater than 0, the vehicle is determined to obtain the assisting power from the outside of the vehicle.

For example, the acceleration threshold is F (F>0). At this moment, when the first acceleration is greater than F, the vehicle is determined to obtain the assisting power from the outside of the vehicle.

At 603, a second traveling state of the vehicle resulted from the assisting power from the outside is determined, and the vehicle is controlled according to the second traveling state to generate a first compensation power configured to compensate for a power for the traveling of the vehicle.

In this embodiment of the disclosure, it is assumed that the first acceleration is a1 and the acceleration threshold is F, the larger the a1-F, the larger the assisting power obtained by the vehicle from the outside. Conversely, the smaller the a1-F, the smaller the assisting power obtained by the vehicle from the outside.

Herein, the reasons for generating the assisting power include but not limited to the followings.

1) One foot of the user stamps on the vehicle body and the other foot hits the ground to obtain the assisting power for the vehicle.

2) An external elastic apparatus is applied to the vehicle so that the vehicle obtains the assisting power.

3) When the vehicle heads a downhill, the assisting power is obtained because of the self gravity.

In this embodiment of the disclosure, when the vehicle obtains the assisting power from the outside, the velocity of the vehicle is changed. As shown in FIG. 3, at the t1-t2 moment, the vehicle obtains the assisting power from the outside and the velocity is changed from 0 to V1; and at the t3-t4 moment, the vehicle obtains the assisting power from the outside and the velocity is changed from V1 to V2.

Herein, the second traveling state of the vehicle resulted from the assisting power from the outside refers to a traveling velocity of the vehicle during a period when the vehicle obtains the assisting power from the outside, where the traveling velocity includes at least one of the following types:

a maximum velocity that the vehicle has during the period when the vehicle obtains the assisting power from the outside;

an average velocity that the vehicle has during the period when the vehicle obtains the assisting power from the outside;

a maximum rotational velocity of the power output rotor of the vehicle motor during the period when the vehicle obtains the assisting power from the outside; or an average rotational velocity of the power output rotor of the vehicle motor during the period when the vehicle obtains the assisting power from the outside.

In this embodiment of the disclosure, from the moment when the assisting power from the outside of the vehicle disappears, the motor assisted slide motor needs to be started, and power compensation is performed on the traveling of the vehicle using the motor.

When the power compensation is performed on the traveling of the vehicle using the motor, it is necessary to first control, according to the second traveling state, the vehicle to generate a first compensation power configured to compensate for a power for the traveling of the vehicle. Herein, the second traveling state of the vehicle may be represented by a traveling velocity of the vehicle when the power from the outside is obtained. For example, the traveling velocity is Vend, and the first compensation power may further maintain the vehicle to decelerate according to a special deceleration.

At 604, decelerated traveling is performed based on the generated first compensation power, and when the decelerated traveling meets a power stop condition, the vehicle is controlled to stop generating the power.

Herein, the initial velocity for the decelerated traveling is a traveling velocity during a period when the vehicle obtains the assisting power from the outside, and the decelerated traveling manner includes uniformly decelerated traveling and non-uniformly decelerated traveling.

With the uniformly decelerated traveling for example, the V1 is the initial velocity for the uniformly decelerated traveling (the corresponding moment is T1), the a is the deceleration, and the velocity at the t moment is as follows: $V(t) = V1 - a*(t-T1)$.

As shown in FIG. 4, when the vehicle is driven by different assisting powers, the generated second traveling states are also different. FIG. 4 shows a velocity change condition of a vehicle when the vehicle is driven by four different assisting powers. From the moment when the assisting power disappears, the velocity of the vehicle is up to a maximum value, and this velocity is taken as an initial velocity for power compensation at the first compensation power. The vehicle may be maintained through the first compensation power to decelerate from the initial velocity.

In this embodiment of the disclosure, the power stop condition includes at least one of the followings:

a traveling time reaches a predetermined duration; or a traveling mileage reaches a predetermined mileage.

In this embodiment of the disclosure, in order to save the electric power of the vehicle, it is necessary to control the vehicle to stop generating the power under a special condition, for example, the traveling time reaches the predetermined duration or the traveling mileage reaches the predetermined mileage. At this moment, the velocity of the vehicle is very small, and the generation of the power may be stopped to save the electric power of the vehicle.

Figure 7:
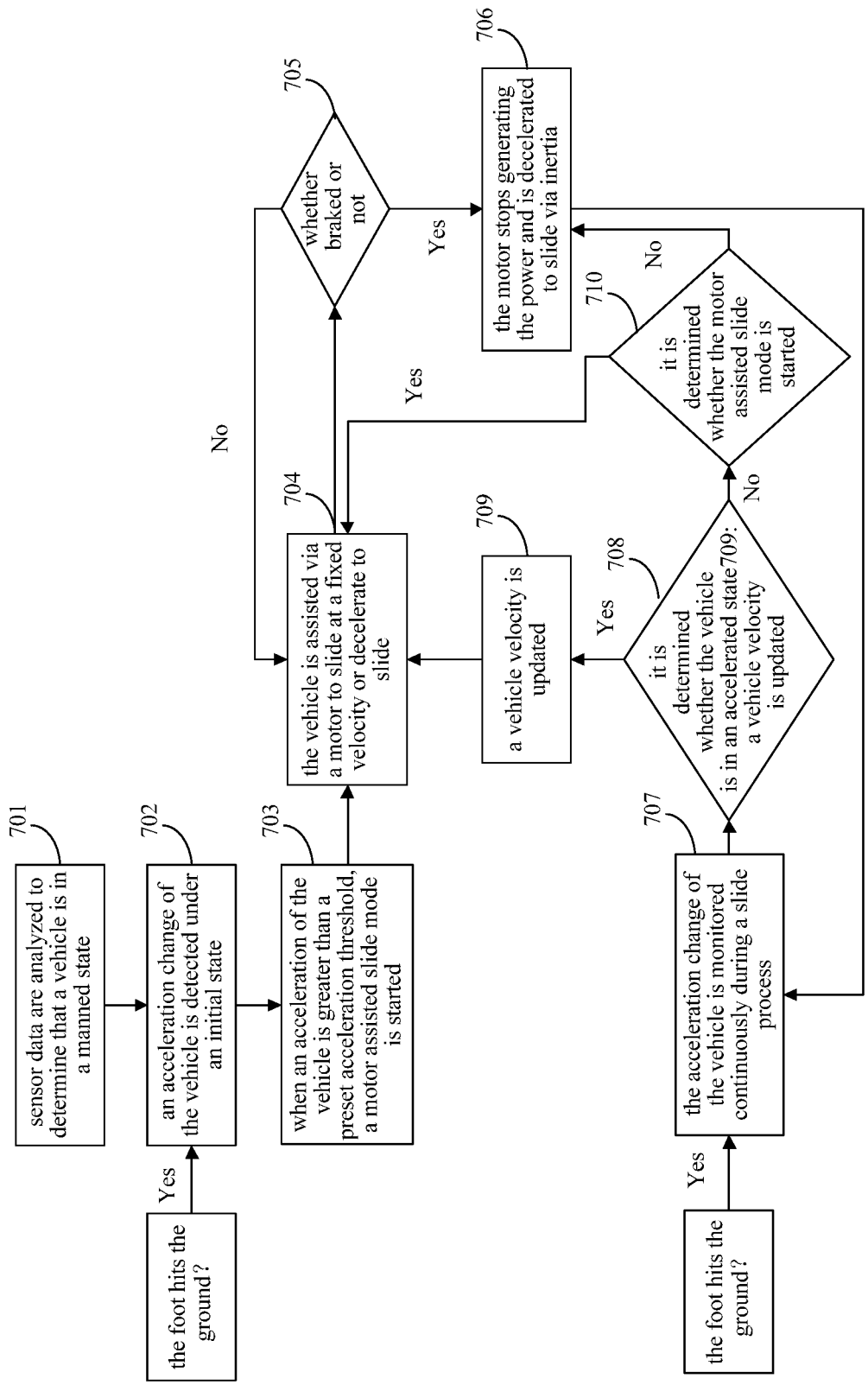
FIG. 7 is a fourth flowchart schematic diagram of a power control method according to an embodiment of the disclosure.

FIG. 7 is a fourth flowchart schematic diagram of a power control method according to an embodiment of the disclosure. As shown in FIG. 7, the power control method may include the following operations.

At 701, sensor data are analyzed to determine that a vehicle is in a manned state.

At 702, an acceleration change of the vehicle is detected under an initial state.

At 703, when an acceleration of the vehicle is greater than a preset acceleration threshold, a motor assisted slide mode is started.

At 704, the vehicle is assisted via a motor to slide at a fixed velocity or decelerate to slide.

At 705, it is determined whether the vehicle is braked, proceed to operation 706 if yes and proceed to operation 704 if no.

At 706, the motor stops generating the power and is decelerated to slide via inertia.

At 707, the acceleration change of the vehicle is monitored continuously during a slide process.

At 708, it is determined whether the vehicle is in an accelerated state, proceed to operation 709 if yes and proceed to operation 710 if no.

At 709, a vehicle velocity is updated, and proceed to operation 704.

At 710, it is determined whether the motor assisted slide mode is started, proceed to operation 704 if yes and proceed to operation 706 if no.

Figure 8:
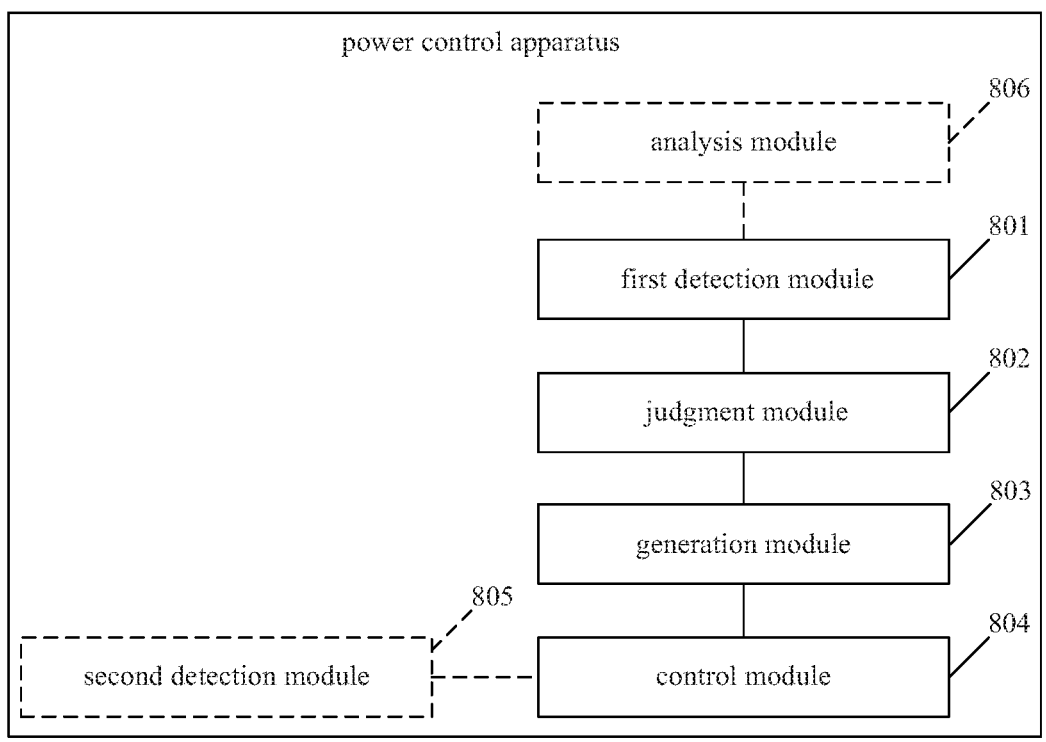
FIG. 8 is a first structural schematic diagram of a power control apparatus according to an embodiment of the disclosure.

FIG. 8 is a first structural schematic diagram of a power control apparatus according to an embodiment of the disclosure. As shown in FIG. 8, the apparatus may include a first detection module 801, a determination module 802, a generation module 803 and a control module 804.

The first detection module 801 is arranged to detect a first traveling state of a vehicle.

The determination module 802 is arranged to determine according to the first traveling state of the vehicle that the vehicle obtains an assisting power from an outside of the vehicle, and determine a second traveling state of the vehicle resulted from the assisting power from the outside.

The generation module 803 is arranged to control, according to the second traveling state, the vehicle to generate a first compensation power configured to compensate for a power for the traveling of the vehicle.

The control module 804 is arranged to control the vehicle to travel based on the generated first compensation power.

In this embodiment of the disclosure, the determination module 802 is further arranged to:

detect the first acceleration of the vehicle, compare the first acceleration of the vehicle with a preset acceleration threshold, and when the first acceleration is greater than the acceleration threshold, determine that the vehicle obtains the assisting power from the outside of the vehicle.

Herein, the first acceleration includes at least one of the followings: an acceleration with which the vehicle travels, or a rotational acceleration of the power output rotor of the vehicle.

In this embodiment of the disclosure, the control module 804 is further arranged to control the vehicle to travel with a constant velocity based on the generated first compensation power; and the constant velocity is a traveling velocity during a period when the vehicle obtains the assisting power from the outside.

In this embodiment of the disclosure, the apparatus may further include a second detection module 805.

The second detection module 805 is arranged to perform decelerated traveling when it is detected that a decelerated traveling condition is met.

Herein, the decelerated traveling condition includes at least one of the followings:

a time for which the vehicle travels with the constant velocity reaches a predetermined duration;

a mileage that the vehicle travels with the constant velocity reaches a predetermined mileage; or a decelerated traveling instruction is received.

In this embodiment of the disclosure, the control module 804 is further arranged to perform decelerated traveling based on the generated first compensation power, and control the vehicle to stop generating the power when the decelerated traveling meets a power stop condition.

Herein, the initial velocity for the decelerated traveling is a traveling velocity during a period when the vehicle obtains the assisting power from the outside, and the decelerated traveling manner includes uniformly decelerated traveling and non-uniformly decelerated traveling.

The power stop condition includes at least one of the followings:

a traveling time reaches a predetermined duration; or a traveling mileage reaches a predetermined mileage.

In this embodiment of the disclosure, the traveling velocity includes at least one of the followings:

a maximum velocity that the vehicle has during the period when the vehicle obtains the assisting power from the outside;

an average velocity that the vehicle has during the period when the vehicle obtains the assisting power from the outside;

a maximum rotational velocity of the power output rotor of the vehicle motor during the period when the vehicle obtains the assisting power from the outside; or an average rotational velocity of the power output rotor of the vehicle motor during the period when the vehicle obtains the assisting power from the outside.

In this embodiment of the disclosure, the apparatus may further include an analysis module 806.

The analysis module 806 is arranged to analyze sensor data to determine that the vehicle is in a manned state before detecting the first traveling state of the vehicle.

Those skilled in the art should understand that implementation functions of each module in the power control apparatus shown in FIG. 8 may be understood with reference to foregoing relevant descriptions on the power control method.

Figure 9:
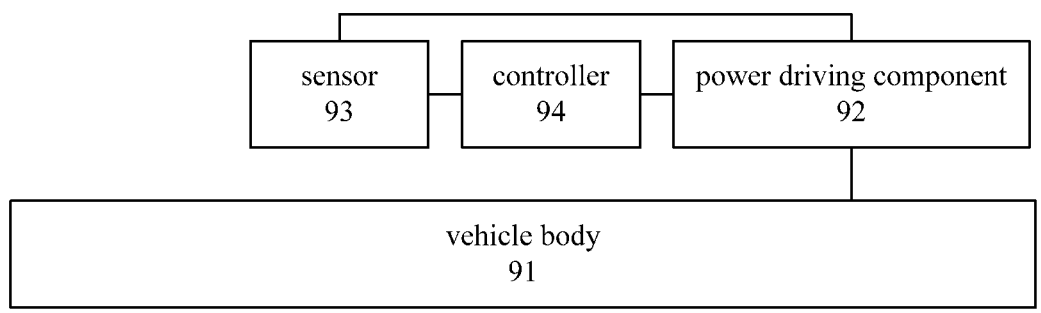
FIG. 9 is a first structural schematic diagram of a vehicle according to an embodiment of the disclosure.

FIG. 9 is a first structural schematic diagram of a vehicle according to an embodiment of the disclosure. As shown in FIG. 9, the vehicle includes a vehicle body 91, a power driving component 92, a sensor 93 and a controller 94. The power driving component 92 is connected with the vehicle body 91 and is arranged to drive the vehicle to travel under the control of the controller 94.

The sensor 93 is arranged to detect a first traveling state of the vehicle.

The controller 94 is arranged to obtain a first traveling state of the vehicle; determine according to the first traveling state of the vehicle that the vehicle obtains an assisting power from an outside of the vehicle; determine a second traveling state of the vehicle resulted from the assisting power from the outside; control, according to the second traveling state, the vehicle to generate a first compensation power configured to compensate for a power for the traveling of the vehicle; and control the vehicle to travel based on the generated first compensation power.

In this embodiment of the disclosure, the vehicle in this embodiment of the disclosure refers to a trackless vehicle, such as a two-wheel scooter, a three-wheel scooter and a four-wheel scooter. A user may drive or ride the vehicle at any site.

In this embodiment of the disclosure, an accelerator does not need to be provided by the vehicle, so the cost thereto is saved. Of course, with a view to the compatibility of the existing vehicle, the accelerator may also be provided by the vehicle. What is noteworthy is that the implementation for the technical solutions in this embodiment of the disclosure is not affected if the accelerator is provided.

In FIG. 2, the power driving component is of a rear wheel driving type. Of course, the power driving component may also be of a front wheel driving type. The power driving component at least is composed of the following components: a driving wheel (namely a wheel), and a motor arranged at the driving wheel. The sensor 93 capable of detecting a position of a power output rotor may be provided in the motor. Herein, the sensor may be a Hall sensor, a photoelectric encoder and a potentiometer, etc.

In addition, the vehicle may further include any other component such as a brake, a front lamp, a handlebar, a vehicle seat and an instrument panel.

The controller 94 in this embodiment of the disclosure may execute any step of the power control method.

Figure 10:
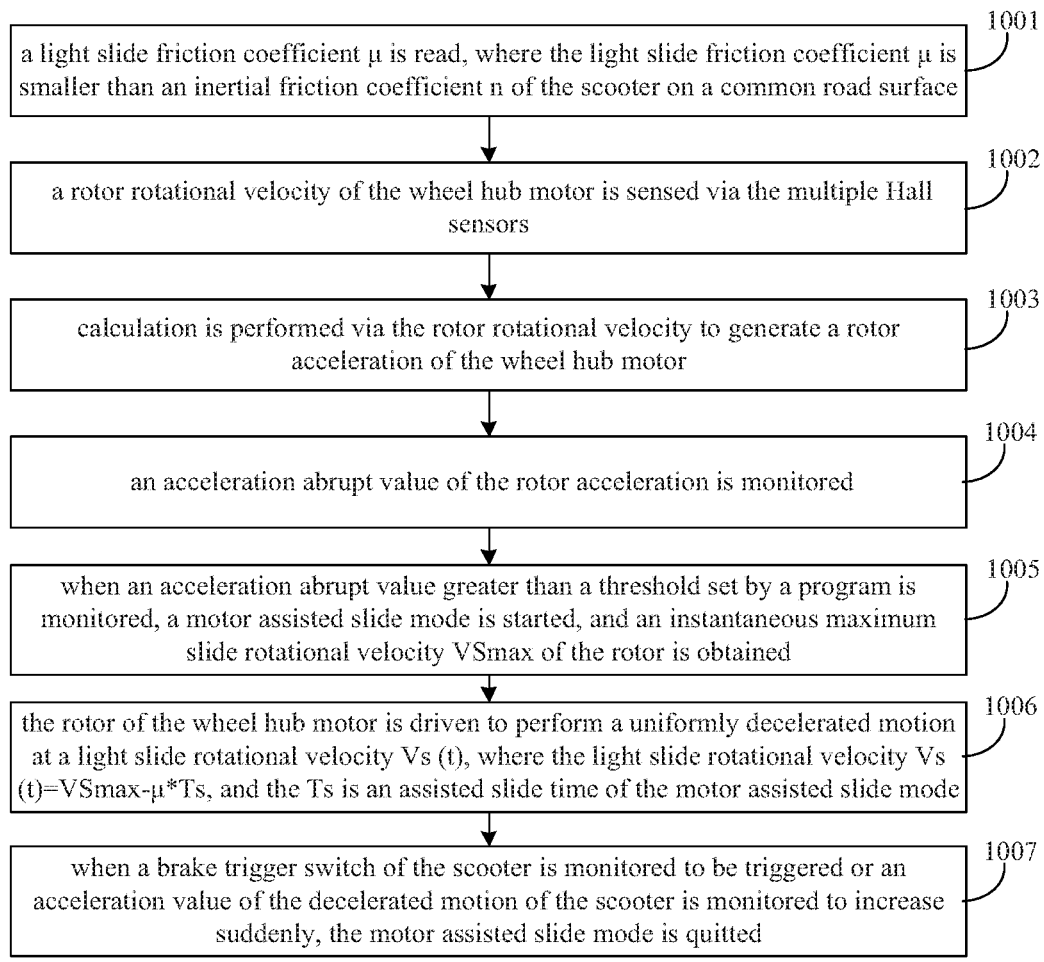
FIG. 10 is a fifth flowchart schematic diagram of a power control method according to an embodiment of the disclosure.

FIG. 10 is a fifth flowchart schematic diagram of a power control method according to an embodiment of the disclosure. This embodiment is applied to a vehicle. The embodiment will be described below with the vehicle that is the scooter as an example. The scooter includes a driving wheel and a wheel hub motor arranged at the driving wheel. The wheel hub motor is provided with multiple Hall sensors. As shown in FIG. 10, a motion control method of the scooter may include the following operations.

At 1001, a light slide friction coefficient μ is read, where the light slide friction coefficient μ is smaller than an inertial friction coefficient n of the scooter on a common road surface.

The light slide friction coefficient μ may be a value preset and stored by the system. Through the light slide friction coefficient μ, a plane at any friction coefficient may be simulated. For example, the light slide friction coefficient μ stored in advance may be stored in a flash chip in advance and its value may be a value of a friction coefficient on an ice surface, a glass surface, a cement road surface and the like, so that a motion state on the ice surface, the glass surface, the cement road surface and so on may be simulated. The light slide friction coefficient μ may also be a value input by the user, for example, when the value input by the user is 0, a uniform slide may be implemented.

At 1002, a rotational velocity of a rotor of a wheel hub motor is sensed using multiple Hall sensors.

Herein, the rotor is made of a magnetic material. When the rotor is rotated, a surrounding magnetic field will be changed. By placing the Hall sensors into the magnetic field and charging a current, a Hall potential difference V will be generated. The potential difference V is changed regularly according to the change of the magnetic field, and thus the position information of the wheel hub motor may be obtained by monitoring the change of the Hall potential difference V. By performing differential operation on the position information and filtering correspondingly, the rotational velocity of the rotor is obtained.

At 1003, calculation is performed from the rotational velocity of the rotor to generate a rotor acceleration of the wheel hub motor.

At 1004, an acceleration abrupt value of the rotor acceleration is monitored.

At 1005, when an acceleration abrupt value greater than a threshold set by a program is monitored, a motor assisted slide mode is started, and an instantaneous maximum slide rotational velocity VSmax of the rotor is obtained.

The threshold set by the program is a constant greater than zero and obtained by analyzing a state when the scooter accelerates previously, or a constant set in the program in advance.

At 1006, the rotor of the wheel hub motor is driven to perform a uniformly decelerated motion at a light slide rotational velocity Vs (t), where the light slide rotational velocity Vs (t)=VSmax-μ*Ts, where Ts is an assisted slide time for which the motor assisted slide mode lasts.

At 1007, when a brake trigger switch of the scooter is monitored to be triggered or an acceleration value of the decelerated motion of the scooter is monitored to increase suddenly, the motor assisted slide mode is exited.

Figure 12:
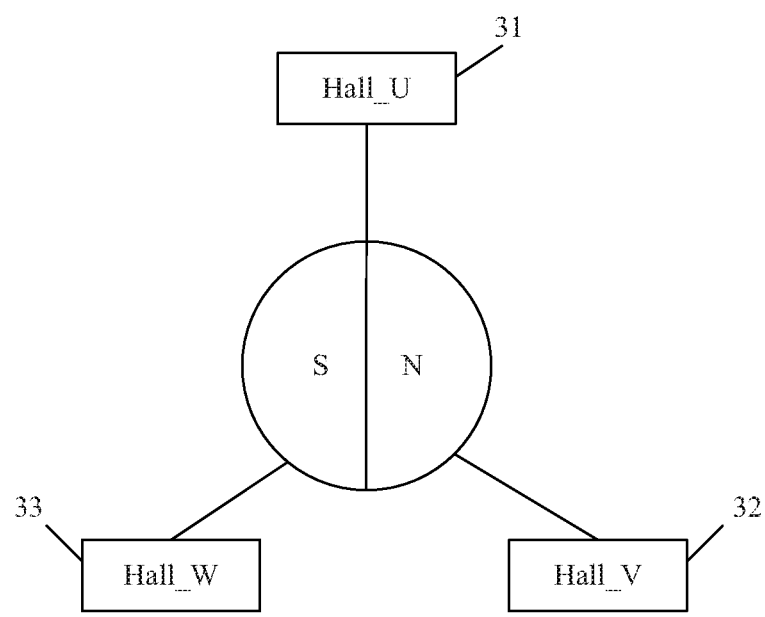
FIG. 12 is a positional schematic diagram of a Hall sensor according to an embodiment of the disclosure.

The Hall sensors are uniformly arranged at an outer periphery of the rotor of the wheel hub motor of the scooter and three or more Hall sensors are provided. Since the wheel hub motor is a three-phase motor, the rotational velocity of the rotor may be accurately measured by at least three Hall sensors. When more than three Hall sensors are provided, the precision of the monitored result may be higher. For example, as shown in FIG. 12, the scooter is provided with a first Hall sensor 31, a second Hall sensor 32 and a third Hall sensor 33 and included angles of connection lines with the rotor all are 120°. By monitoring the velocity of the rotor using the Hall sensors, a velocity function V=f (t) between a velocity V and a time t is obtained. By performing derivation calculation on the velocity function, an acceleration function A=f (t) of the rotor may be obtained; and then, by analyzing the acceleration function, the acceleration abrupt value of the driving wheel of the scooter may be monitored. According to the method of the disclosure, since the built-in Hall sensors provided by the wheel hub motor are used to monitor the acceleration abrupt value of the driving wheel of the scooter, the same effect that the motion state monitoring is performed by using an acceleration sensor can be achieved; and moreover, the acceleration sensor is not required to be added additionally, so the weight of the scooter is reduced, and the production cost of the scooter is reduced.

In one aspect of this embodiment of the disclosure, the motion control method of the scooter may further include the following operation: when a brake trigger switch of the scooter is monitored to be triggered or an acceleration value of the decelerated motion of the scooter is monitored to increase suddenly, a motor brake mode is started, an instantaneous maximum brake rotational velocity VBmax of the rotor is obtained, and the rotor of the wheel hub motor is driven to perform a decelerated motion at a brake rotational velocity Vb (t), where the brake rotational velocity Vb (t)=VBmax-a*Tb, where Tb is a brake time for which the motor brake mode lasts, a is a brake coefficient and the brake coefficient a is greater than the light slide friction coefficient μ.

Further, the brake coefficient a is greater than the inertial friction coefficient n. The preset threshold is a value set by the system in advance. As the acceleration abrupt value is smaller than the threshold, it may be predicted that a brake measure is taken by the user. While the motor assisted slide mode is exited, the motor brake mode is entered, so that the scooter can be stopped at a quicker speed. The motor brake mode may be implemented by enabling a motor assisted tensional brake pad to stop the continuous rotation of the wheel.

Figure 11:
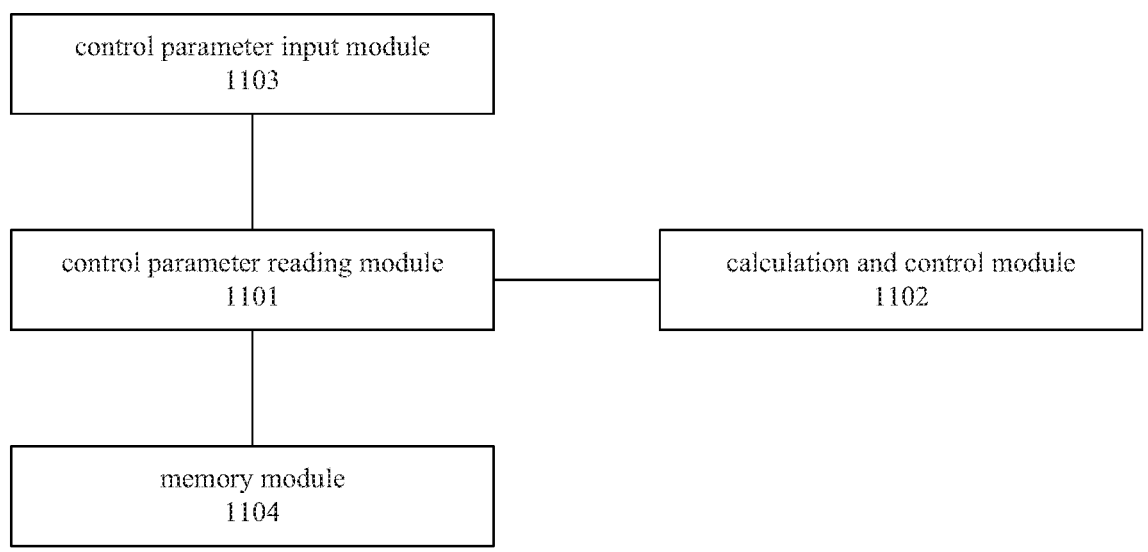
FIG. 11 is a second structural schematic diagram of a power control apparatus according to an embodiment of the disclosure.

FIG. 11 is a second structural schematic diagram of a power control apparatus according to an embodiment of the disclosure. The power control apparatus is applied to a vehicle; the vehicle includes a driving wheel and a wheel hub motor arranged at the driving wheel; the wheel hub motor is provided with multiple Hall sensors and is arranged to sense a rotational velocity of a rotor of the wheel hub motor; and as shown in FIG. 11, the apparatus may include a control parameter reading module 1101 and a calculation and control module 1102.

The control parameter reading module 1101 is arranged to read a light slide friction coefficient μ, where the light slide friction coefficient μ is smaller than an inertial friction coefficient n of the vehicle on a common road surface. The light slide friction coefficient μ may be a value preset and stored by the system. Through the light slide friction coefficient μ, a plane at any friction coefficient may be simulated. For example, the light slide friction coefficient μ stored in advance may be stored in a flash chip in advance and its value may be a value of a friction coefficient on an ice surface, a glass surface, a cement road surface and the like, so that a motion state on the ice surface, the glass surface, the cement road surface and so on may be simulated. The light slide friction coefficient μ may also be a value input by the user, for example, when the value input by the user is 0, a uniform slide may be implemented.

The calculation and control module 1102 is arranged to calculate from the rotational velocity of the rotor to generate a rotor acceleration of the wheel hub motor, monitor a change in the rotor acceleration to generate an acceleration abrupt value, start a motor assisted slide mode and obtain an instantaneous maximum slide rotational velocity VSmax of the rotor when an acceleration abrupt value greater than zero is monitored, and drive the rotor of the wheel hub motor to perform a uniformly decelerated motion at a light slide rotational velocity Vs (t), where the light slide rotational velocity Vs (t)=VSmax-μ*Ts, where Ts is an assisted slide time for which the motor assisted slide mode lasts. Herein, the rotor is made of a magnetic material. When the rotor is rotated, a surrounding magnetic field will be changed. By placing the Hall sensors into the magnetic field and charging a current, a Hall potential difference V will be generated. The potential difference V is changed regularly according to the change of the magnetic field. Therefore, by monitoring the change of the Hall potential difference V, the rotational velocity of the rotor of the wheel hub motor may be obtained. Further, the calculation and control module 1102 is further arranged to exit the motor assisted slide mode when it is monitored that a brake trigger switch of the scooter is triggered or an acceleration value of the decelerated motion of the scooter increases suddenly. According to the method of the disclosure, since the built-in Hall sensors provided by the wheel hub motor are used to monitor the acceleration abrupt value of the driving wheel of the vehicle, the same effect that the motion state monitoring is performed by using an acceleration sensor can be achieved; and moreover, the acceleration sensor is not required to be added additionally, so the weight of the vehicle is reduced, and the production cost of the vehicle is reduced.

In one aspect of this embodiment of the disclosure, the calculation and control module 1102 is further arranged to start a motor brake mode and drive the rotor of the wheel hub motor to perform a decelerated motion at a brake rotational velocity Vb (t) when it is monitored that a brake trigger switch of the scooter is triggered or an acceleration value of the decelerated motion of the scooter increases suddenly, where the brake rotational velocity Vb (t)=VBmax-a*Tb, where Tb is a brake time for which the motor brake mode lasts, a is a brake coefficient and the brake coefficient a is greater than the light slide friction coefficient μ. Further, the brake coefficient a is greater than the inertial friction coefficient n. The preset threshold is a value set by the system in advance. As the acceleration abrupt value is smaller than the threshold, it may be predicted that a brake measure is taken by the user. While the motor assisted slide mode is exited, the motor brake mode is entered, so that the scooter can be stopped at a quicker speed. The motor brake mode may be implemented by enabling a motor assisted tensional brake pad to stop the continuous rotation of the wheel.

In one aspect of this embodiment of the disclosure, the vehicle is a scooter; the Hall sensors are uniformly arranged at an outer periphery of a rotor of a wheel hub motor of the scooter and three or more Hall sensors are provided. Since the wheel hub motor is a three-phase motor, the rotational velocity of the rotor can be accurately measured by at least three Hall sensors. When more than three Hall sensors are provided, the precision of the monitored result may be higher. For example, as shown in FIG. 12, the scooter is provided with a first Hall sensor 31, a second Hall sensor 32 and a third Hall sensor 33 and included angles of connection lines with the rotor all are 120°. By monitoring the velocity of the rotor using the Hall sensors, a velocity function V=f (t) between a velocity V and a time t is obtained. By performing derivation calculation on the velocity function, an acceleration function A=f (t) of the rotor may be obtained; and then, by analyzing the acceleration function, the acceleration abrupt value of the driving wheel of the scooter may be monitored. The apparatus may further includes a control parameter input module 1103, arranged to input the light slide friction coefficient μ; and a memory module 1104, arranged to store the light slide friction coefficient μ, the inertial friction coefficient n, the maximum brake rotational velocity VBmax, the assisted slide time Ts and the brake time Tb. Optionally, the memory module may be a flash chip.

Figure 13:
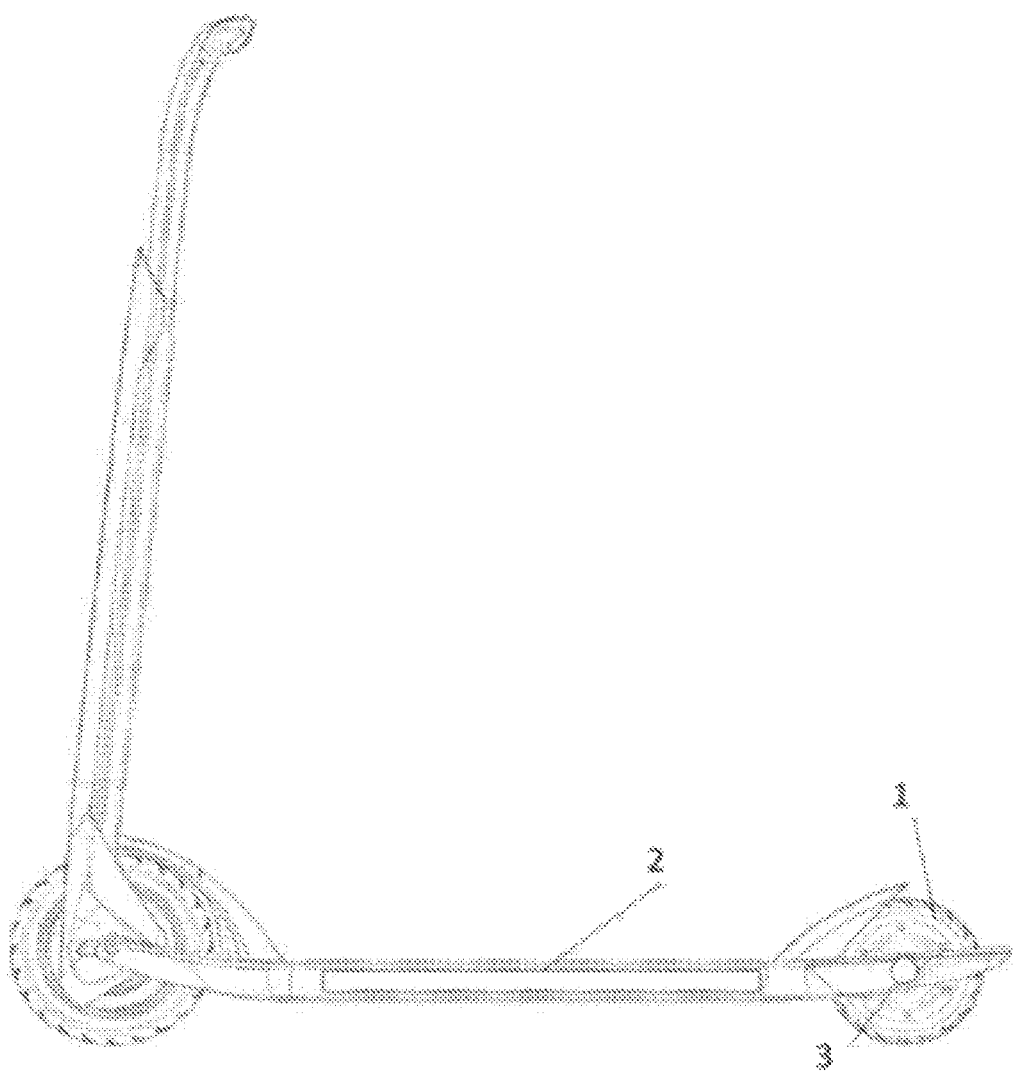
FIG. 13 is a second schematic diagram of a scooter according to an embodiment of the disclosure.

FIG. 13 is a second schematic diagram of a scooter according to an embodiment of the disclosure. As shown in FIG. 13, the scooter includes a driving wheel 1, an electric energy device 2 and a wheel hub motor 3 arranged on the driving wheel; the wheel hub motor is provided with multiple Hall sensors; and the electric energy device is arranged to supply an operation power for the wheel hub motor. The scooter includes a motion control system of the scooter mentioned in the second embodiment. According to the scooter of the disclosure, since the built-in Hall sensors provided by the wheel hub motor are used to monitor the acceleration abrupt value of the driving wheel of the scooter, the same effect that the motion state monitoring is performed by using an acceleration sensor can be achieved; and moreover, the acceleration sensor is not required to be added additionally, so the weight of the scooter is reduced, and the production cost of the scooter is reduced.

For example, the user wants to experience sliding on the glass by using the scooter provided by the disclosure, the control parameter reading module may be enabled to read a friction coefficient μ=0.05 of a glass surface stored in the flash chip in advance; and meanwhile, the calculation and control module starts to monitor an acceleration change of the scooter. When the foot of the user hits the ground to accelerate the scooter, it is monitored that the scooter makes an accelerated motion at an acceleration greater than a threshold 0 set by the program; at this moment, the maximum velocity such as VSmax=8 m/s after the scooter is accelerated is obtained; and then, the motor assisted slide mode is started and the wheel hub motor is driven so that the scooter makes a uniformly decelerate motion at the initial velocity 8 m/s and the acceleration −0.05 m/s2. Herein, the relationship between the motion speed and the time is as follows: Vs (t)=8−0.05 t.

The monitoring is performed continuously. When the brake trigger switch of the scooter is monitored to be triggered or the acceleration value of the deceleration motion of the scooter is monitored to increase suddenly, it may be predicted that the user makes a decelerated operation. At this moment, the motor assisted slide mode is exited so that the scooter is stopped. When the brake trigger switch of the scooter is monitored to be triggered or the acceleration value of the deceleration motion of the scooter is monitored to increase suddenly, a brake mode further may be started. At this moment, the instantaneous maximum brake rotational velocity of the rotor, for example, VBmax=8 m/s, is obtained, the rotor of the wheel hub motor is driven to perform a decelerated motion at the brake rotational velocity Vb (t) and the brake coefficient is set as −16 m/s2, the brake rotational velocity Vb (t)=8−16 Tb; that is, through 0.5 s, the scooter may be stopped quickly.

In one aspect of this embodiment of the disclosure, the acceleration abrupt value of a driving wheel of a scooter is monitored by Hall sensors; the Hall sensors are uniformly arranged at an outer periphery of a rotor of a wheel hub motor of the scooter and three or more Hall sensors are provided. Since the wheel hub motor is a three-phase motor, the rotational velocity of the rotor can be accurately measured by at least three Hall sensors. When more than three Hall sensors are provided, the precision of the monitored result may be higher. For example, as shown in FIG. 12, the scooter is provided with a first Hall sensor 31, a second Hall sensor 32 and a third Hall sensor 33 and included angles of connection lines with the rotor all are 120°. By monitoring the velocity of the rotor using the Hall sensors, a velocity function V=f (t) between a velocity V and a time t is obtained. By performing derivation calculation on the velocity function, an acceleration function A=ƒ (t) of the rotor may be obtained; and then, by analyzing the acceleration function, the acceleration abrupt value of the driving wheel of the scooter may be monitored. For example, during the above uniformly decelerated slide stage, the velocity Vs (t)=f (t)=8−0.05 t may be monitored; and then, through calculation, the acceleration function As (t)=ƒ'(t)=8−0.05 is obtained. The acceleration abrupt value at the uniform-velocity stage is 0.

When being implemented in form of software function module and sold or used as an independent product, the apparatus in the embodiments of the disclosure may also be stored in a computer-readable storage medium. Based on such an understanding, the technical solutions of the embodiments of the disclosure substantially or parts making contributions to the conventional art may be embodied in form of software product, and the computer software product is stored in a storage medium, including a plurality of instructions arranged to enable a piece of computer equipment (which may be a personal computer, a server, network equipment or the like) to execute all or part of the method in each embodiment of the disclosure. The above-mentioned storage medium includes: various media capable of storing program codes such as mobile storage equipment, a Read Only Memory (ROM), a Random-Access Memory (RAM), a magnetic disk or an optical disk. Therefore, the embodiments of the disclosure are not limited to any special hardware and software combination.

Correspondingly, an embodiment of the disclosure further provides computer storage medium, which stores a computer program; and the computer program is arranged to execute the power control method in the above embodiment of the disclosure.

The technical solutions in the embodiments of the disclosure may be freely combined if there is no conflict.

In some embodiments provided by the application, it should be understood that the disclosed method and intelligent equipment may be implemented in other manners. The equipment embodiment described above is only schematic, and for example, division of the units is only logic function division, and other division manners may be adopted during practical implementation. For example, multiple units or components may be combined or integrated into another system, or some characteristics may be neglected or not executed. In addition, coupling, or direct coupling or communication connection between each displayed or discussed component may be indirect coupling or communication connection, implemented through some interfaces, of the equipment or the units, and may be electrical and mechanical or adopt other forms.

The modules described as separate parts may or may not be physically separated, and parts displayed as modules may or may not be physical units, and namely may be located in the same place, or may also be distributed to multiple network units. Part or all of the units may be selected to achieve the purpose of the solutions of the embodiments according to a practical requirement.

In addition, each function module in each embodiment of the disclosure may be integrated into a second processing unit, each module may also exist independently, and two or more than two modules may also be integrated into one module. The integrated unit may be implemented in a hardware form, and may also be implemented in form of hardware and software function unit.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure.

INDUSTRIAL APPLICABILITY

By adopting the technical solutions of the embodiments of the disclosure, the traveling of the vehicle may be controlled without an accelerator and only using the assisting power from the outside of the vehicle, so the vehicle cost caused by the accelerator is reduced. Furthermore, a user may flexibly control the traveling of the vehicle in a foot stamping manner, so the operation manner is simple, easy, safe and reliable, and the enjoyment for the use of the vehicle is greatly increased. Since the built-in Hall sensors provided by the wheel hub motor are used to monitor the acceleration abrupt value of the driving wheel of the vehicle, the same effect that the motion state monitoring is performed by using an acceleration sensor can be achieved; and moreover, the acceleration sensor is not required to be added additionally, so the weight of the vehicle is reduced, and the production cost of the vehicle is reduced.

The invention claimed is:

1. A power control method, comprising:
    detecting a first traveling state of a vehicle;
    determining according to the first traveling state of the vehicle that the vehicle obtains an assisting power from outside of the vehicle;
    determining a second traveling state of the vehicle resulting from the assisting power from the outside;
    controlling, according to the second traveling state, the vehicle to generate a first compensation power configured to compensate for a power for traveling of the vehicle; and
    controlling the vehicle to travel based on the first compensation power,
    wherein controlling the vehicle to travel based on the first compensation power comprises:
        controlling the vehicle to perform decelerated traveling based on the first compensation power, and when the decelerated traveling meets a power stop condition, controlling the vehicle to stop generating the first compensation power,
    wherein an initial velocity for the decelerated traveling is a traveling velocity during a period when the vehicle obtains the assisting power from the outside, and the decelerated traveling comprises uniformly decelerated traveling and non-uniformly decelerated traveling,
    wherein the power stop condition comprises at least one of:
        a traveling time reaches a predetermined duration; or
        a traveling mileage reaches a predetermined mileage,
    wherein the first compensation power maintains the vehicle to decelerate according to a specific negative acceleration.

2. The method of claim 1, wherein determining according to the first traveling state of the vehicle that the vehicle obtains the assisting power from the outside of the vehicle comprises:
    detecting a first acceleration of the vehicle, comparing the first acceleration of the vehicle with a preset acceleration threshold, and when the first acceleration is greater than the preset acceleration threshold, determining that the vehicle obtains the assisting power from the outside of the vehicle, wherein the first acceleration comprises at least one of: an acceleration with which the vehicle travels, or a rotational acceleration of a power output rotor of the vehicle.

3. The method of claim 1, further comprising: before detecting the first traveling state of the vehicle, analyzing sensor data to determine that the vehicle is in a manned state.

4. A vehicle, comprising a vehicle body, a power driving component, a sensor and a controller, wherein the power driving component is connected with the vehicle body and is arranged to drive the vehicle to travel under control of the controller;

the sensor is arranged to detect a first traveling state of the vehicle; and the controller is arranged to obtain the first traveling state of the vehicle; determine according to the first traveling state of the vehicle that the vehicle obtains an assisting power from outside of the vehicle; determine a second traveling state of the vehicle resulting from the assisting power from the outside; control, according to the second traveling state, the vehicle to generate a first compensation power configured to compensate for a power for traveling of the vehicle; and control the vehicle to travel based on the first compensation power, wherein, in order to control the vehicle to travel based on the first compensation power, the controller is arranged to perform a step of:

controlling the vehicle to perform decelerated traveling based on the first compensation power, and when the decelerated traveling meets a power stop condition, controlling the vehicle to stop generating the first compensation power, wherein an initial velocity for the decelerated traveling is a traveling velocity during a period when the vehicle obtains the assisting power from the outside, and the decelerated traveling comprises uniformly decelerated traveling and non-uniformly decelerated traveling, wherein the power stop condition comprises at least one of:

a traveling time reaches a predetermined duration; or a traveling mileage reaches a predetermined mileage, wherein the first compensation power maintains the vehicle to decelerate according to a specific negative acceleration.

5. The vehicle according to claim 4, wherein in order to determine according to the first traveling state of the vehicle that the vehicle obtains the assisting power from the outside of the vehicle, the sensor is arranged to perform a step of detecting a first acceleration of the vehicle; and the controller is arranged to perform a step of:

comparing the first acceleration of the vehicle with a preset acceleration threshold, and when the first acceleration is greater than the preset acceleration threshold, determining that the vehicle obtains the assisting power from the outside of the vehicle, wherein the first acceleration comprises at least one of: an acceleration with which the vehicle travels, or a rotational acceleration of a power output rotor of the vehicle.

6. The vehicle of claim 4, wherein the controller is further arranged to perform a step of: before the first traveling state of the vehicle is detected, analyzing sensor data to determine that the vehicle is in a manned state.

7. A non-transitory computer storage medium having stored thereon computer executable instructions configured to execute a power control method, the power control method comprising:

detecting a first traveling state of a vehicle;

determining according to the first traveling state of the vehicle that the vehicle obtains an assisting power from outside of the vehicle;

determining a second traveling state of the vehicle resulting from the assisting power from the outside;

controlling, according to the second traveling state, the vehicle to generate a first compensation power configured to compensate for a power for traveling of the vehicle; and controlling the vehicle to travel based on the first compensation power, wherein controlling the vehicle to travel based on the first compensation power comprises:

performing decelerated traveling based on the first compensation power, and when the decelerated traveling meets a power stop condition, controlling the vehicle to stop generating the first compensation power, wherein an initial velocity for the decelerated traveling is a traveling velocity during a period when the vehicle obtains the assisting power from the outside, and the decelerated traveling comprises uniformly decelerated traveling and non-uniformly decelerated traveling, wherein the power stop condition comprises at least one of:

a traveling time reaches a predetermined duration; or a traveling mileage reaches a predetermined mileage, wherein the first compensation power maintains the vehicle to decelerate according to a specific negative acceleration.

8. The non-transitory computer storage medium of claim 7, wherein determining according to the first traveling state of the vehicle that the vehicle obtains the assisting power from the outside of the vehicle comprises:

detecting a first acceleration of the vehicle, comparing the first acceleration of the vehicle with a preset acceleration threshold, and when the first acceleration is greater than the preset acceleration threshold, determining that the vehicle obtains the assisting power from the outside of the vehicle, wherein the first acceleration comprises at least one of: an acceleration with which the vehicle travels, or a rotational acceleration of a power output rotor of the vehicle.

9. The non-transitory computer storage medium of claim 7, wherein the power control method further comprises: before detecting the first traveling state of the vehicle, analyzing sensor data to determine that the vehicle is in a manned state.

* * * * *